United States Patent
Arngren et al.

(10) Patent No.: US 9,846,696 B2
(45) Date of Patent: Dec. 19, 2017

(54) APPARATUS AND METHODS FOR INDEXING MULTIMEDIA CONTENT

(75) Inventors: Tommy Arngren, Sodra Sunderbyn (SE); Joakim Soderberg, Solna (SE); Marika Stalnacke, Lulea (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 931 days.

(21) Appl. No.: 13/408,448

(22) Filed: Feb. 29, 2012

(65) Prior Publication Data

US 2013/0226930 A1 Aug. 29, 2013

(51) Int. Cl.
*G06F 17/30* (2006.01)

(52) U.S. Cl.
CPC ...... *G06F 17/3002* (2013.01); *G06F 17/3082* (2013.01); *G06F 17/30858* (2013.01)

(58) Field of Classification Search
None
See application file for complete search history.

(56) References Cited

U.S. PATENT DOCUMENTS

| | | | |
|---|---|---|---|
| 5,678,040 A | 10/1997 | Vasudevan | |
| 5,832,495 A * | 11/1998 | Gustman | |
| 5,963,940 A | 10/1999 | Liddy | |
| 6,026,388 A | 2/2000 | Liddy | |
| 6,363,380 B1 * | 3/2002 | Dimitrova | 707/740 |
| 6,374,260 B1 | 4/2002 | Hoffert | |
| 6,484,156 B1 | 11/2002 | Gupta | |
| 6,643,643 B1 | 11/2003 | Lee | |
| 7,131,059 B2 | 10/2006 | Obrador | |
| 7,149,359 B1 | 12/2006 | Omoigui | |
| 7,382,933 B2 | 6/2008 | Dorai | |
| 7,493,312 B2 | 2/2009 | Liu | |

(Continued)

FOREIGN PATENT DOCUMENTS

| | | |
|---|---|---|
| EP | 1 024 437 A2 | 8/2000 |
| EP | 1 220 541 A2 | 7/2002 |

(Continued)

OTHER PUBLICATIONS

"MPEG-7 Overview," International Organisation for Standardisation, ISO/IEC JTC1/SC29/WG11, Coding of Moving Pictures and Audio, Oct. 2004, pp. 1-95.

(Continued)

*Primary Examiner* — Alford Kindred
*Assistant Examiner* — Jesse P Frumkin
(74) *Attorney, Agent, or Firm* — Rothwell, Figg, Ernst & Manbeck, p.c.

(57) ABSTRACT

A method, medium, and apparatus are disclosed for indexing multimedia content by a computer. The method comprises segmenting the multimedia content into a plurality of segments. For each segment, the method identifies one or more features present in the segment, wherein the features are of respective media types. The method then identifies, for each identified feature in each segment, one or more respective keywords associated the identified feature. Then, the method determines, for each identified keyword associated with an identified feature in a given segment, a respective relevance of the keyword to the given segment. The respective relevance is dependent on a weight associated with the respective media type of the identified feature.

29 Claims, 9 Drawing Sheets

(56) References Cited

U.S. PATENT DOCUMENTS

| | | |
|---|---|---|
| 7,627,556 B2 | 12/2009 | Liu |
| 7,676,495 B2 | 3/2010 | Qian |
| 8,060,906 B2 | 11/2011 | Begeja |
| 8,065,301 B2 | 11/2011 | Ginsburg |
| 8,166,029 B2 | 4/2012 | Park |
| 8,438,157 B2 | 5/2013 | Adams, Jr. |
| 8,566,370 B2 | 10/2013 | Jin |
| 8,611,422 B1 | 12/2013 | Yagnik |
| 9,292,552 B2 | 3/2016 | Arngren |
| 9,633,015 B2 | 4/2017 | Arngren |
| 2001/0047379 A1 | 11/2001 | Jun |
| 2002/0054083 A1 | 5/2002 | Boreczky |
| 2002/0097983 A1 | 7/2002 | Wallace |
| 2002/0161747 A1 | 10/2002 | Li |
| 2003/0033347 A1* | 2/2003 | Bolle ............... G06F 17/30253 718/107 |
| 2003/0105589 A1 | 6/2003 | Liu |
| 2003/0107592 A1* | 6/2003 | Li et al. ................. 345/745 |
| 2003/0108334 A1* | 6/2003 | Nevenka et al. ............. 386/95 |
| 2004/0025180 A1 | 2/2004 | Begeja |
| 2004/0111432 A1* | 6/2004 | Adams et al. ............ 707/104.1 |
| 2004/0162870 A1 | 8/2004 | Matsuzaki |
| 2004/0215663 A1 | 10/2004 | Liu |
| 2004/0220925 A1 | 11/2004 | Liu |
| 2005/0102312 A1 | 5/2005 | Ohya |
| 2005/0222981 A1 | 10/2005 | Lawrence |
| 2006/0122984 A1 | 6/2006 | Byers |
| 2006/0149624 A1 | 7/2006 | Baluja |
| 2006/0218191 A1 | 9/2006 | Gopalakrishnan |
| 2006/0282336 A1 | 12/2006 | Huang |
| 2007/0033515 A1* | 2/2007 | Sull et al. ................. 715/500.1 |
| 2007/0067304 A1 | 3/2007 | Ives |
| 2007/0106646 A1* | 5/2007 | Stern et al. ................. 707/3 |
| 2007/0106660 A1* | 5/2007 | Stern et al. ................. 707/5 |
| 2007/0220025 A1 | 9/2007 | Hyman |
| 2008/0016101 A1 | 1/2008 | Ginsburg |
| 2008/0016293 A1 | 1/2008 | Saika |
| 2008/0086688 A1 | 4/2008 | Chandratillake |
| 2008/0112690 A1 | 5/2008 | Shahraray |
| 2008/0124055 A1 | 5/2008 | Shahraray |
| 2008/0232775 A1 | 9/2008 | Ljolje |
| 2008/0310628 A1 | 12/2008 | Fujioka |
| 2009/0006368 A1* | 1/2009 | Mei ................. G06F 17/30796 |
| 2009/0041356 A1* | 2/2009 | Barbieri et al. ............. 382/190 |
| 2009/0110296 A1* | 4/2009 | Sekiguchi et al. ........... 382/218 |
| 2009/0116645 A1 | 5/2009 | Jeong |
| 2009/0138472 A1 | 5/2009 | MacLean |
| 2009/0154806 A1 | 6/2009 | Chang |
| 2009/0210779 A1 | 8/2009 | Badoiu |
| 2009/0240674 A1 | 9/2009 | Wilde |
| 2009/0300351 A1 | 12/2009 | Lei |
| 2010/0005121 A1* | 1/2010 | Benitez et al. ............ 707/104.1 |
| 2010/0070485 A1 | 3/2010 | Parsons |
| 2010/0094630 A1* | 4/2010 | Yoakum ................... 704/254 |
| 2010/0138292 A1 | 6/2010 | Park |
| 2010/0158470 A1* | 6/2010 | Tzoukermann et al. ....... 386/46 |
| 2010/0161580 A1 | 6/2010 | Chipman |
| 2011/0010372 A1* | 1/2011 | Sahasrabudhe et al. ..... 707/749 |
| 2011/0047163 A1* | 2/2011 | Chechik et al. ............. 707/741 |
| 2011/0072012 A1* | 3/2011 | Ah-Pine ............ G06F 17/30274 707/725 |
| 2011/0154405 A1 | 6/2011 | Isaias |
| 2011/0208722 A1* | 8/2011 | Hannuksela ........ G06F 17/3002 707/723 |
| 2011/0249956 A1 | 10/2011 | Komai |
| 2011/0299721 A1 | 12/2011 | He |
| 2012/0023084 A1 | 1/2012 | Lalji |
| 2012/0089580 A1 | 4/2012 | Yamashita |
| 2012/0110080 A1 | 5/2012 | Panyam |
| 2012/0124055 A1 | 5/2012 | Deubel |
| 2012/0158713 A1* | 6/2012 | Jin et al. ................. 707/728 |
| 2013/0151534 A1 | 6/2013 | Luks |
| 2013/0166587 A1 | 6/2013 | Berry |
| 2013/0219024 A1 | 8/2013 | Flack |
| 2013/0226930 A1 | 8/2013 | Arngren |
| 2013/0282687 A1* | 10/2013 | Ah-Pine et al. ............. 707/706 |
| 2014/0032538 A1 | 1/2014 | Arngren |
| 2014/0032562 A1 | 1/2014 | Arngren |
| 2014/0229488 A1 | 8/2014 | Arngren |
| 2015/0234824 A1 | 8/2015 | Arngren |
| 2016/0085860 A1 | 3/2016 | Wallenberg |
| 2016/0210443 A1 | 7/2016 | Arngren |

FOREIGN PATENT DOCUMENTS

| | | | |
|---|---|---|---|
| EP | 1 480 100 A1 | 11/2004 | |
| EP | 2202647 A1 * | 6/2010 | |
| EP | 2 216 731 A2 | 8/2010 | |
| EP | 2 323 046 A1 | 5/2011 | |
| EP | 2 444 921 A2 | 10/2011 | |
| EP | 2 657 884 A2 | 10/2013 | |
| FI | WO 2012001216 A1 * | 1/2012 | ............ G10L 25/48 |
| WO | 01/17163 A1 | 3/2001 | |
| WO | 02/084980 A1 | 10/2002 | |
| WO | 2010/150226 A2 | 12/2010 | |
| WO | 2011/104428 A1 | 9/2011 | |
| WO | 2014/185834 A1 | 11/2014 | |
| WO | 2015/030645 A1 | 3/2015 | |
| WO | 2015/030646 A1 | 3/2015 | |

OTHER PUBLICATIONS

9th International Workshop on Content-Based Multimedia Indexing (CBMI 2011), homepage, 2 pages, http://www-vpu.eps.uam.es/cbmi2011/.

Advisory Action for U.S. Appl. No. 13/559,258, dated Apr. 21, 2014, 3 pages.

Advisory Action for U.S. Appl. No. 13/559,258, dated Aug. 27, 2015, 3 pages.

Cisco Systems, Inc., "Cisco Visual Networking Index: Forecast and Methodology, 2012-2017," Cisco White Paper, May 29, 2013, 15 pages.

Cisco Systems, Inc., "Cisco Visual Networking Index: Global Mobile Data Traffic Forecast Update," 2012-2017, Cisco White Paper, Feb. 6, 2013, 34 pages.

Cisco Systems, Inc., "Press Release: Cisco Global Cloud Index Forecasts Cloud Traffic to Grow Sixfold by 2016," retrieved Jul. 8, 2014, dated Oct. 23, 2012, 5 pages.

Examiner-Initiated Interview Summary for U.S. Appl. No. 13/688,566 dated Nov. 16, 2015, 1 page.

Extended European Search Report for European Patent Application No. 14839431.5, dated Jul. 22, 2016, 9 pages.

Final Office Action for U.S. Appl. No. 13/559,258, dated Feb. 4, 2014, 20 pages.

Final Office Action for U.S. Appl. No. 13/559,258, dated Jun. 19, 2015, 23 pages.

Final Office Action for U.S. Appl. No. 13/559,258, dated Sep. 9, 2016, 39 pages.

Final Office Action for U.S. Appl. No. 13/688,566, dated Sep. 10, 2015, 16 pages.

Garcia, E., "The Term Count Model: Demystifying Term Vector Calculations," Oct. 27, 2006, 7 pages, http://web.archive.org/web/20121029050356/http://www.miislita.com/term-vector/term-vector-2.html.

International Search Report and Written Opinion issued in International Application No. PCT/SE2014/050655, dated Mar. 2, 2015, 15 pages.

International Search Report and Written Opinion of the ISA issued for International Patent Application No. PCT/SE2014/050027 dated Nov. 3, 2014, 9 pages.

International Search Report and Written Opinion of the ISA issued for International Patent Application No. PCT/SE2013/050536, dated Apr. 10, 2014, 19 pages.

International Search Report and Written Opinion of the ISA issued for International Patent Application No. PCT/SE2014/050240, dated Dec. 8, 2014, 14 pages.

Lawto, "A Scalable Video Search Engine Based on Audio Content Indexing and Topic Segmentation," Turin, Italy, Sep. 2011, http://

(56) References Cited

OTHER PUBLICATIONS hal.archivesouvertes.fr/docs/00/64/52/28/PDF/NEMSummit2011_final2.pdf [retrieved on Apr. 2, 2014], 6 pages.
Lew, M.S., "Content-Based Multimedia Information Retrieval: State of the Art and Challenges," ACM Transactions on Multimedia Computing, Communications and Applications, vol. 2, No. 1, Feb. 2006, pp. 1-19.
National Phase of PCT/SE2014/050027, U.S. Appl. No. 14/915,408, filed Feb. 29, 2016, 57 pages.
Non-Final Office Action for U.S. Appl. No. 13/559,258, dated Aug. 15, 2013, 15 pages.
Non-Final Office Action for U.S. Appl. No. 13/559,258, dated Dec. 31, 2014, 17 pages.
Non-Final Office Action for U.S. Appl. No. 13/559,258, dated Jan. 20, 2016, 23 pages.
Non-Final Office Action for U.S. Appl. No. 13/688,566, dated Mar. 12, 2015, 11 pages.
Non-Final Office Action for U.S. Appl. No. 13/688,566, dated Sep. 10, 2014, 10 pages.
Notice of Allowance for U.S. Appl. No. 13/688,566, dated Dec. 30, 2015, 19 pages.
Notice of Allowance issued in U.S. Appl. No. 13/559,258, dated Dec. 2, 2016, 10 pages.
Response to Final Office Action filed in U.S. Appl. No. 13/559,258, filed Nov. 9, 2016, 13 pages.
Saracoglu, Ahmet et. al.,"Content Based Copy Detection with Coarse, Audio-Visual Fingerprints", 2009 Seventh International Workshop on Content-Based Multimedia Indexing, 2009, IEEE, 6 pages.
Supplementary European Search Report for European Patent Application No. 14893538 dated Mar. 6, 2017, 3 pages.
Weisstein, Eric W. "Probability Axioms," From MathWorld—A Wolfram Web Resource. http://mathworld.wolfram.com/ProbabilityAxioms.html, 1 page.
www.google.com print screen of "Obama" search results, Aug. 16, 2013, 3 pages.
Yang, W., "Discriminative Tag Learning on YouTube Videos with Latent Sub-tags," in proceeding of The 24th IEEE Conference on Computer Vision and Pattern Recognition, CVPR 2011, Colorado Springs, CO, USA, Jun. 20-25, 2011, pp. 3217-3224.
Youtube and Shazam homepages retrieved on May 26, 2014, 2 pages.

\* cited by examiner

SSO table 500

| File | Date | Loc. | Seg. | Keyword | Img | Text | Sound | Voice | Length | Occurence | Rank |
|------|------|------|------|---------|-----|------|-------|-------|--------|-----------|------|
| xxx | D | L | 1 | Lisa | x | | | x | 5 | 1 | 18 |
| xxx | D | L | 2 | Olle | x | | | | 3 | 1 | 14 |
| xxx | D | L | 2 | Lisa | | x | | x | 3 | 1 | 7 |
| xxx | D | L | 3 | ICA | x | | | | 4 | 2 | 21 |
| xxx | D | L | 3 | Banana | x | | | | 1 | 1 | 12 |
| xxx | D | L | 3 | Jerry | x | | | x | 8 | 2 | 22 |
| xxx | D | L | 4 | Ball | x | | | | 2 | 1 | 13 |

Weight table 510

| Media Type | Weight |
|------------|--------|
| Image | 10 |
| Text | 5 |
| Sound | 3 |
| Voice | 2 |

STOC 520

| Rank | Keyword | File | Seg. |
|------|---------|------|------|
| 25 | Lisa | xxx | 1,2 |
| 24 | Olle | yyy | 1 |
| 22 | Jerry | xxx | 3 |
| 21 | Lisa | yyy | 4 |
| 21 | ICA | xxx | 4 |
| 21 | Football | yyy | 1 |
| 20 | Jerry | yyy | 2 |
| 18 | Stadium | yyy | 2 |
| 14 | Olle | xxx | 2 |
| 13 | Ball | xxx | 4 |
| 13 | Sky | yyy | 1 |
| 12 | Banana | xxx | 3 |
| 12 | Grass | yyy | 2 |

*FIG. 5*

Computer-readable medium 820 a set of instructions for segmenting content into a plurality of segments
905 a set of instructions for identifying, for each segment, one or more features present in the segment, where the features are of respective media types
910 a set of instructions for identifying, for each identified feature in each segment, one or more respective keywords associated with the identified feature
915 a set of instructions for determining, for each identified keyword associated with an identified feature in a given segment, a respective relevance of the keyword to the given segment, wherein the respective relevance is dependent on a weight associated with the respective media type of the identified feature.
920

*FIG. 9*

APPARATUS AND METHODS FOR INDEXING MULTIMEDIA CONTENT

TECHNICAL FIELD

Embodiments relate generally to digital search techniques and more specifically, to indexing of multimedia content.

BACKGROUND

As the available amount of multimedia content grows, so does the need for effective search and retrieval systems. Search and retrieval systems ("search engines") typically operate by receiving (e.g., from a user) a textual query of terms and/or phrases. The search engine compares the search terms ("keywords") against a body of searchable content and returns an indication of the most relevant items in that content. The classic example of a search engine is an Internet search engine that uses user-provided keywords to find relevant web pages and returns a listing of the most relevant ones.

As the amount of digital data increases, search engines are being deployed not only for Internet search, but also for proprietary, personal, or special-purpose databases, such as personal multimedia archives, user generated content sites, proprietary data stores, workplace databases, and others. For example, personal computers may host search engines to find content on the entire computer or in special-purpose archives (e.g., personal music or video collection). User generated content sites, which host multimedia and/or other types of content, may provide custom search functionality tailored to that type of content.

To facilitate efficient search and retrieval, search engines typically pre-process content by creating indices. Once created, indices allow a search engine to map search terms to relevant content without need to rescan all of the content on each search. Therefore, the quality of search results is heavily dependent on the quality of the index generated. Accordingly, more effective techniques for generating accurate search indices are needed.

SUMMARY

A method, medium, and apparatus are disclosed for indexing multimedia content by a computer. In some embodiments, the method comprises segmenting the multimedia content into a plurality of segments. For each segment, the method may identify one or more features present in the segment, wherein the features are of respective media types. The method may then identify, for each identified feature in each segment, one or more respective keywords associated the identified feature. The method may then determine, for each identified keyword associated with an identified feature in a given segment, a respective relevance of the keyword to the given segment. The respective relevance may be dependent on a weight associated with the respective media type of the identified feature.

In some embodiments, any of the keywords may be associated with at least two features in a segment. In such cases, the respective relevance of the keyword to the segment is dependent on the respective media types of the two features.

In some embodiments, the method may further comprise creating an index for the multimedia content that correlates each identified keyword with those of the plurality of segments that are determined as being relevant to the keyword based on the determined respective relevances. In such embodiments, the method may further comprise querying the index by (1) receiving a query for multimedia content, (2) determining a keyword based on the query, (3) determining a segment of the plurality of segments based on the determined keyword and the index, and (4) providing an indication of the segment. In some embodiments, the method may comprise providing (in response to the query) a list of segments arranged in order of relevance.

In some embodiments, the method may comprise determining a relevance of at least one of the keywords to a file comprising multiple ones of the segments. The keyword's relevance to the file may be dependent on the relevances of the keyword to the multiple ones of the segments of the file. In some embodiments, the respective relevance of the keyword to the given segment may be further dependent on a prevalence of the identified feature, associated with the keyword, within the given segment. In some embodiments, the prevalence may be dependent on a proportion of the given segment in which the identified feature is present.

In some embodiments, the content may comprise a plurality of audio-visual files. The different media types may include at least one of image, sound, text, speech, or content metadata. In some embodiments, the content metadata may include at least one of: geographic positioning data, user generated text associated with the feature, or other user generated tags.

A medium is also disclosed, which stores program instructions executable by a computer to implement a multimedia content indexer. In some embodiments, the content indexer may be configured to segment multimedia content into a plurality of segments. For each segment, the indexer may identify one or more features present in the segment, wherein the features are of respective media types. The indexer may then identify, for each identified feature in each segment, one or more respective keywords associated the identified feature. Then, the indexer may determine, for each identified keyword associated with an identified feature in a given segment, a respective relevance of the keyword to the given segment. The respective relevance may be dependent on a weight associated with the respective media type of the identified feature.

An apparatus is also disclosed. In some embodiments, the apparatus may comprise a processor and a memory coupled to the processor. The memory may store program instructions executable by the processor to implement a multimedia content indexer. The indexer may be configured to segment multimedia content into a plurality of segments. For each segment, the indexer may identify one or more features present in the segment, wherein the features are of respective media types. The indexer may then identify, for each identified feature in each segment, one or more respective keywords associated the identified feature. The indexer may determine, for each identified keyword associated with an identified feature in a given segment, a respective relevance of the keyword to the given segment. The respective relevance may be dependent on a weight associated with the respective media type of the identified feature.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 5 illustrates an example of SSO, weight data, and STOC data stored in database tables, according to some embodiments.

FIG. 9 illustrates an embodiment of a computer readable program code, according to some embodiments.

DETAILED DESCRIPTION

Traditional search engines are most naturally suited to finding textual content that is relevant to textual keywords. However, as the amount and importance of multimedia content increases, new techniques must be developed to facilitate search and retrieval of multimedia content. Traditional techniques have attempted to correlate keywords with textual metadata associated with a multimedia file (e.g., filename), but such approaches are inherently limited because they search only secondary indicators and ignore the primary content of those multimedia files.

According to various embodiments, a search engine may be configured to facilitate effective search and retrieval of multimedia content by building a search index based on primary content of multimedia files. In some embodiments, an indexer may segment each multimedia file into a plurality of segments (e.g., time segments of a movie), and for each segment, identify various "features" present in the segment. The different features may be of different media types, such as a visual feature (e.g., image of a bird), an audio feature (e.g., call of the bird), a textual feature (e.g., image text describing the bird), a voice feature (e.g., narration describing the bird), or others. For each identified feature, the indexer may employ various algorithmic techniques to identify one or more respective keywords that correspond to that feature. For each keyword identified for a given segment, the indexer may increase the relevance of the keyword (with relation to the segment) according to various parameters, such as a predefined weight given to features of that type, a determined degree of prominence of that feature in the segment, and/or other considerations. The total relevance of a keyword to a segment may be a function of the keyword's relevance to each one of the features in that segment. Likewise, the total relevance of a keyword to a file may be a function of the keyword's relevance to each one of the segments of that file. Accordingly, an object of various embodiments is to facilitate effective search and retrieval of multimedia content by building and utilizing a search index of the multimedia files.

Figure 1:
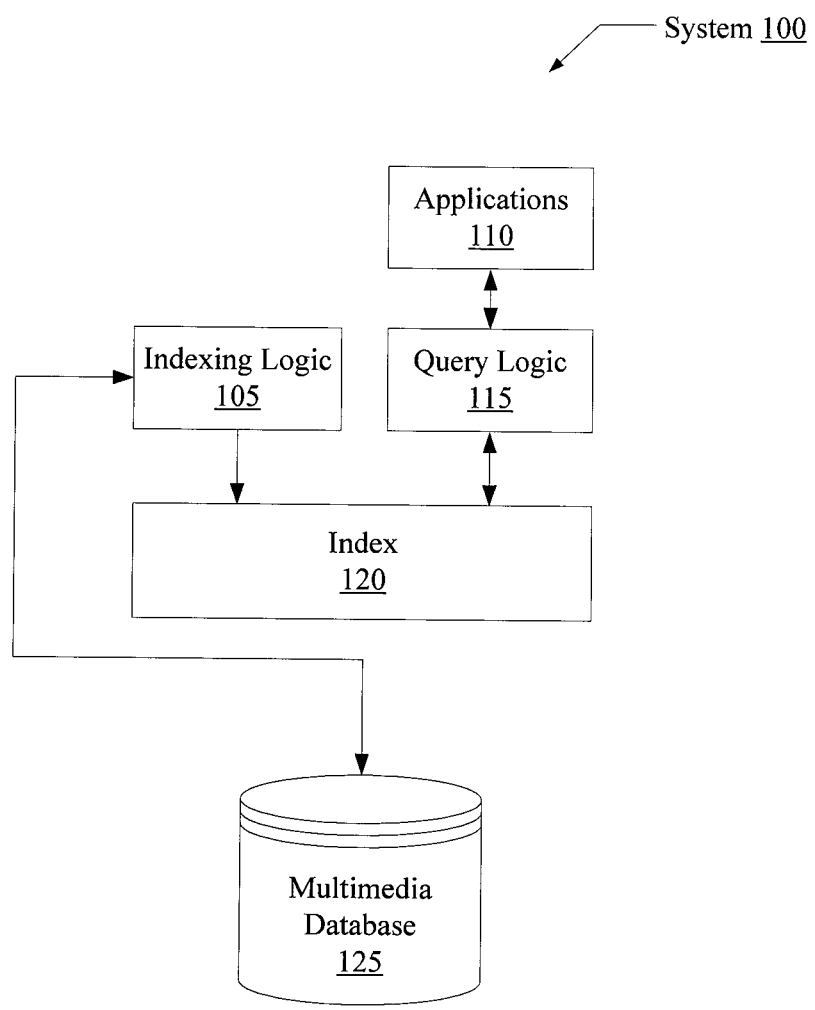
FIG. 1 is a block diagram illustrating some logical components of a system configured to perform multimedia indexing, according to various embodiments.

FIG. 1 is a block diagram illustrating some logical components of a system configured to perform multimedia indexing, according to various embodiments. In various embodiments, system 100 and/or any of its components may be implemented in software executing on one or more physical and/or virtual computers, by specialized hardware components, or by a combination thereof.

According to FIG. 1, system 100 comprises multimedia database 125. Multimedia database 125 may be implemented as any type of content repository. For example, database 125 may be implemented as a managed database system (e.g., relational database management system, hierarchical database system, etc.) or as a content repository (e.g., directory of multimedia files). Multimedia database 125 may store a plurality of multimedia files, such as audio visual files.

In various embodiments, database 125 may be implemented on the same computer as the other components, on a different computer (e.g., a database server), or on multiple other computers (e.g., cluster, cloud service, etc.). In embodiments where database 125 is implemented on a separate computer, various other components of system 100 may be connected to database 125 via one or more computer networks, such as a local area network (e.g., Ethernet network) and/or wide area network (e.g., Internet).

According to the illustrated embodiment, system 100 includes indexing logic 105. Indexing logic 105 may access multimedia database 125 to create index 120 of the content on database 125. To create, update, and/or otherwise maintain index 120, indexing logic 105 may be configured to perform various indexing methods described herein, such as feature extraction, feature weighting, and prominence detection.

Index 120 may correlate keywords to particular multimedia content stored in database 125. Index 120 may store indications of respective degrees of relevance of various keywords to different multimedia files (or segments of multimedia files) stored on database 125. According to various embodiments, index 120 may take various forms, such as a static table of contents, as described herein.

According to the illustrated embodiment, index 120 may be used by any number of applications 110 (via query logic 115) to find and retrieve content from multimedia database 125. Applications 110 may include any type of application, such as personal media management software, web applications, and/or stand-alone applications.

In some embodiments, an application of 110 may include an interface for receiving a query (e.g., keywords). For example, application 110 may include a graphical user interface configured to receive a query from a user. In another example, the interface may be a programmatic interface configured to receive a query from another application (e.g., locally or from across a network).

In some instances, the query may take the form of one or more keywords. In other instances, the query may take the form of other multimedia (e.g., movies, pictures, audio, etc.). Where the query takes the form of other multimedia, the application 110 and/or query logic 115 may be configured to convert the multimedia query into one or more relevant textual keywords and use those keywords, in conjunction with index 120, to determine relevant content in multimedia database 125.

According to FIG. 1, system 100 includes query logic 115. Query logic 115 may be configured to receive queries from one or more applications 110 via a programmatic interface, such as a local communications library or web services interface. As discussed above, the query may take the form of keywords and/or of multimedia query content. Query logic 115 may use the query and index 120 to discover multimedia relevant content in database 125 (i.e., content relevant to the query). For example, if the query is a keyword, query logic 115 may look up the keyword in index 120 to discover the n most relevant videos (or video segments) in multimedia database 125. In response to discovering the relevant content, query logic 115 may return one or more indications of that content to application 110. In some embodiments, application 110 may retrieve the content directly from database 125, query logic 115 may retrieve the content from database 125 and return it to application 110, and/or application 110 may access the content using other mechanisms.

The illustrated components of FIG. 1 are provided for exemplary purposes only. One of ordinary skill in the art will recognize that in various embodiments, fewer or additional components may be provided and various components may be combined and/or decomposed further. In addition, any of components of system 100 may be implemented on the same or different physical and/or virtual computer. For example, in some embodiments, all of components 105-125 may be implemented as software components executing on a single computer. In other embodiments, the components may be implemented on a distributed architecture. For example, indexing logic 105 and index 120 may exist on a cluster of computers that also implement multimedia database 125, while various instances of query logic 115 exists on a separate servers and applications 110 exist on different client machines distributed over a network. In some embodiments, indexing logic 105, query logic 115, index 120, and multimedia database 125 may be implemented as part of a relational database, such as MySQL. Many other configurations are possible and it is intended that this disclosure cover all such embodiments.

Figure 2:
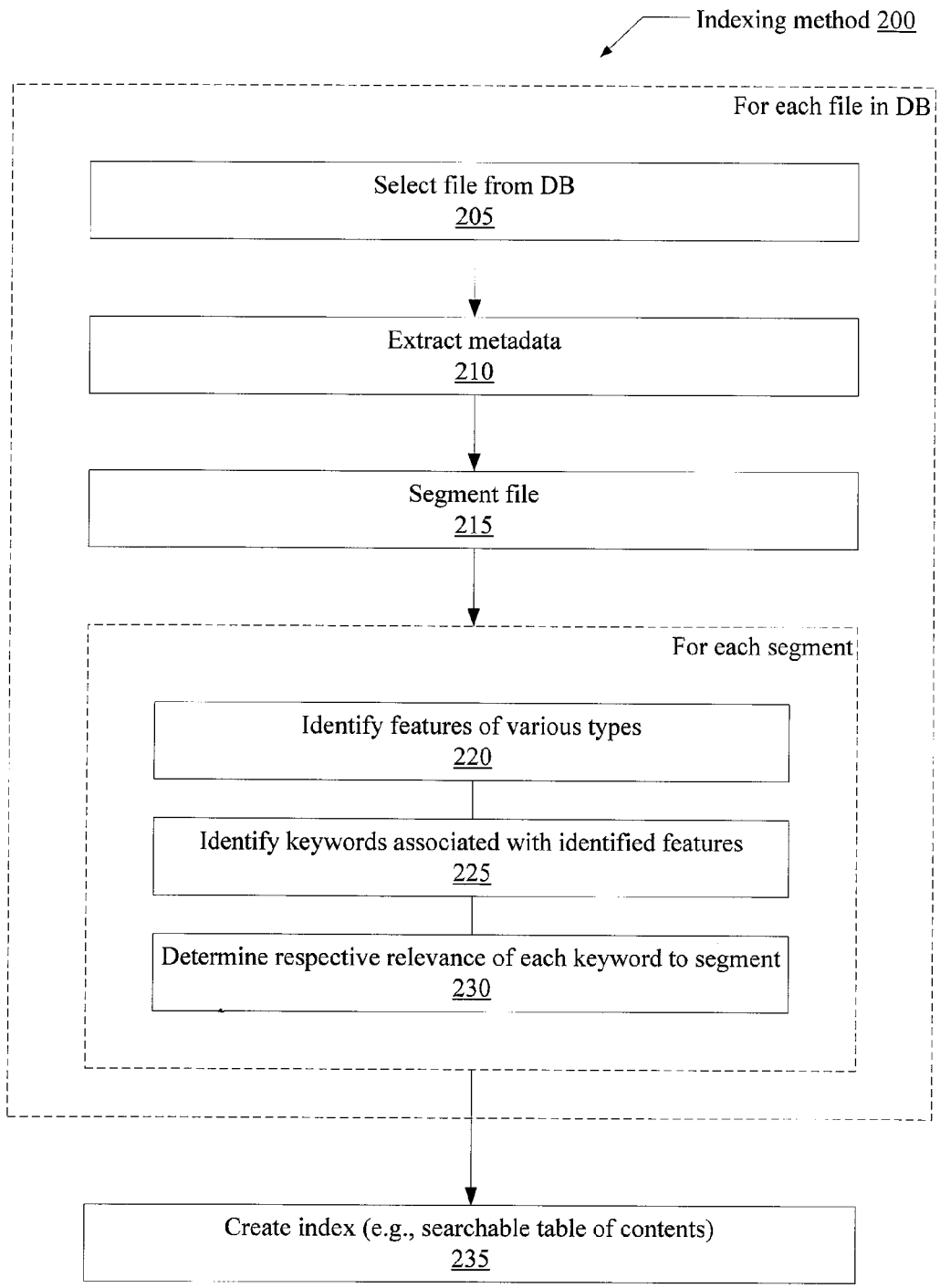
FIG. 2 is a flow diagram illustrating an indexing method, according to some embodiments.

FIG. 2 is a flow diagram illustrating an indexing method, according to some embodiments. Indexing method 200, shown in FIG. 2, may be implemented by indexing logic (e.g., indexing logic 105) to create an index (e.g., index 120) of a multimedia database (e.g., database 125). In various embodiments, the indexing logic may be implemented by software, a special-purpose hardware component, and/or by any combination thereof.

Method 200 begins by selecting a file from the multimedia database (as indicated, indexing method 200 may execute on each file in the multimedia database). For purposes of explanation, the multimedia file in the examples below is a movie file. However, it should be noted that the techniques described herein are applicable to any multimedia file.

In 210, metadata (e.g., date, time, location, file name, user-generated tags, etc.) is extracted from the multimedia file. Such metadata may correspond to secondary indications of the media's content and/or may be used to identify the file.

In 215, the multimedia file is segmented. For example, the file may be segmented (e.g., by time, scene, etc.) into multiple time frames. In such embodiments, the time frames may be of a predefined length (i.e., static) or of a length that varies depending on file attributes (i.e., dynamic). The length of a dynamic time frame may be vary depending on different attributes, such as the overall length of the movie, the number of features identified in each segment, degree of feature change, and/or other characteristics. For example, a movie file may be segmented into contiguous segments such that there is at least a minimum degree of difference between the features of each segment. Dynamic segmentation may also combine various criteria (e.g., minimum degree of difference and minimum length).

For each segment of the file, the method identifies relevant keywords by executing 220 to 230. In 220, the method analyzes the segment to identify relevant "features" apparent in the segment. The term "feature" may refer to any recognizable pattern within the multimedia file that can be associated with a keyword. A feature may be of any of various media types, such as a visual feature (e.g., image of a bird), an audio feature (e.g., call of the bird), a textual feature (e.g., image text describing the bird), a voice feature (e.g., narration describing the bird), or others.

In 225, the method includes identifying keywords associated with the identified features. For example, if an identified feature is an image of a pelican, the feature may be associated with the keywords "pelican", "bird", "animal", "beak", and/or other keywords.

Features may be identified in 220 and associated with keywords in 225 using various artificial intelligence techniques, including image recognition, face recognition, voice recognition, sound recognition, pattern recognition, and/or other techniques. Various such techniques are known in the art and any combination of such known and/or future techniques may be utilized. For example, video shot segmentation may be performed using known digital video retrieval techniques. In some embodiments, keywords associated with those features may be determined using known machine learning techniques, such as support vector machines (SVM), and/or statistical approaches, such as hidden markov models (HMM) and Bayesian Belief Networks (BBNs). In some embodiments, Audio feature detection may be performed by known voice recognition techniques.

In 230, the method determines the respective relevance of each identified keyword to each segment. Step 230 is explained in more detail with relation to FIG. 3.

In 235, the method creates (or updates) an index, such as index 120 of FIG. 1. As discussed above, the index may take the form of a searchable table of contents or any other index usable to determine content in the multimedia database that is relevant to one or more keywords.

Figure 3:
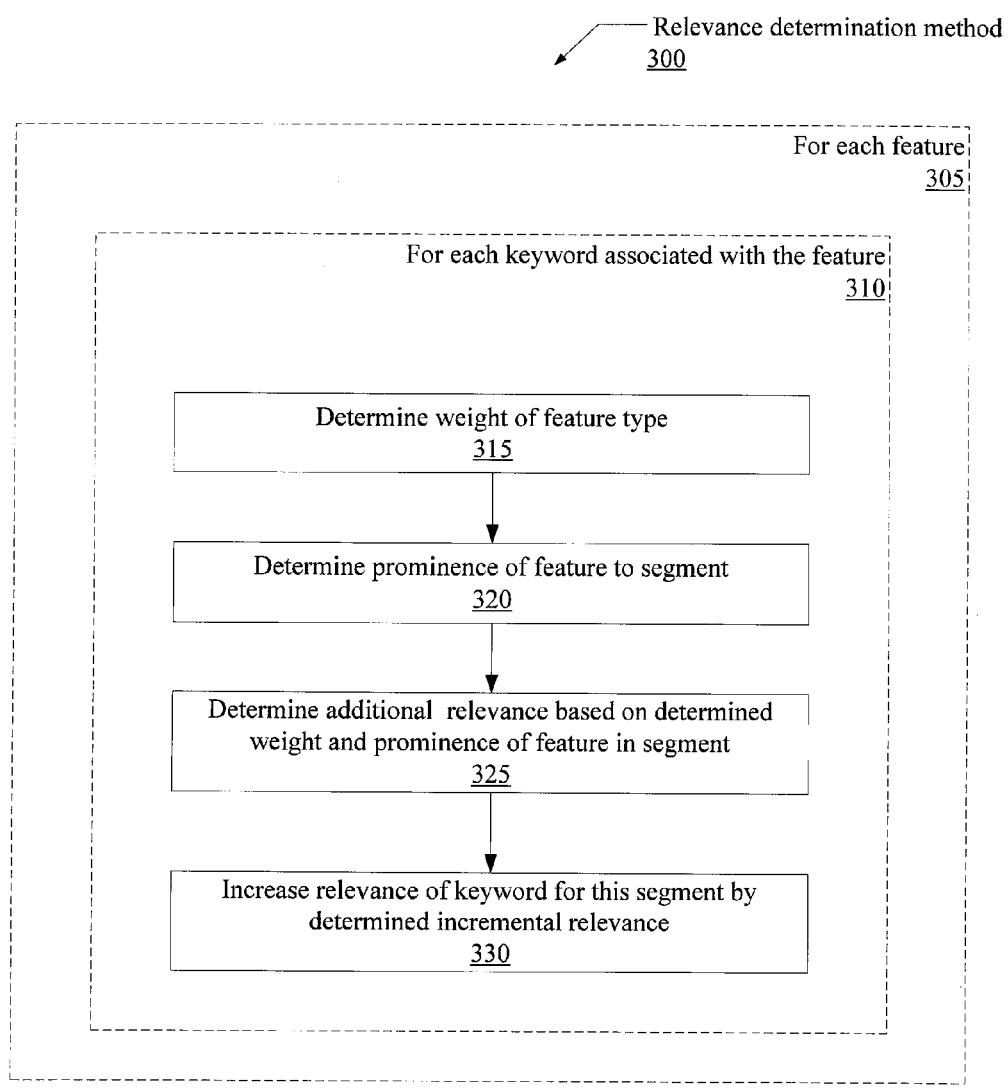
FIG. 3 is a flow diagram illustrating a method of determining a relevance of a keyword to a given segment, according to some embodiments.

FIG. 3 is a flow diagram illustrating a method of determining a relevance of a keyword to a given segment, according to some embodiments. Method 300 may be performed by indexing logic (e.g., 105) and may be used to implement step 230 of FIG. 2.

According to the illustrated embodiment, relevance determination method 300 may iterate over every feature/keyword combination (e.g., loop 305 and loop 310). For each keyword/feature tuple, the method may increase the relevance of the keyword for the segment as follows. In 315, the method determines a weight associated with the feature's media type. In some embodiments, each type of media (e.g., image, sound, text, voice, etc.) may be associated with a given (e.g., pre-defined) weight that reflects how important that type of feature is to the relevance of a keyword. The overall relevance score of the keyword for the segment may therefore be dependent on the media type of the associated feature. In various embodiments, the weights associated with different media types may be maintained in a weight table.

In some embodiments, the method may consider more than the media type of the feature. For example, in step 320 of the illustrated embodiment, the method determines the prominence of the feature in the segment. For example, a visual feature that appears throughout the segment may be more prominent than a visual feature that appears in only the first half of the segment. Likewise, an image in the foreground (e.g., larger) may be more prominent than an image in the background (e.g., smaller), an audio feature that is loud may be more prominent than one that is quiet, and so forth.

In some embodiments, the relevance of a keyword may be affected by the type, prominence, and/or other attributes of the associated feature. For example, in FIG. 3, the feature prominence and type weight (calculated in 320 and 315 respectively) are used in 325 to determine an additional relevance of the keyword to the segment. In various embodiments, different functions may be used to determine the additional relevance based on the set of attributes.

In 330, the method increases a relevance score of the keyword (with respect to the given segment) by the amount determined in 325 (i.e., based on the weight and prominence). Once all the keyword/feature pairs have been processed, the resulting relevance of each keyword corresponds to the relevance of that keyword for the segment. The relevance of a keyword to a multimedia file may be a function of the individual relevance values of that keyword to each segment (e.g., sum).

Returning now to FIG. 2, in 235, the respective keyword relevance to each file and/or segment may be stored in an index (e.g., index 400). In various embodiments, the index may be implemented as any combination of in-memory data structures, files in a file system, tables and/or entries in one or more databases, or other storage formats. The index may be used to correlate keywords with file names and/or segments and to determine the relevance of each keyword to one or more respective files and/or segments.

Figure 4:
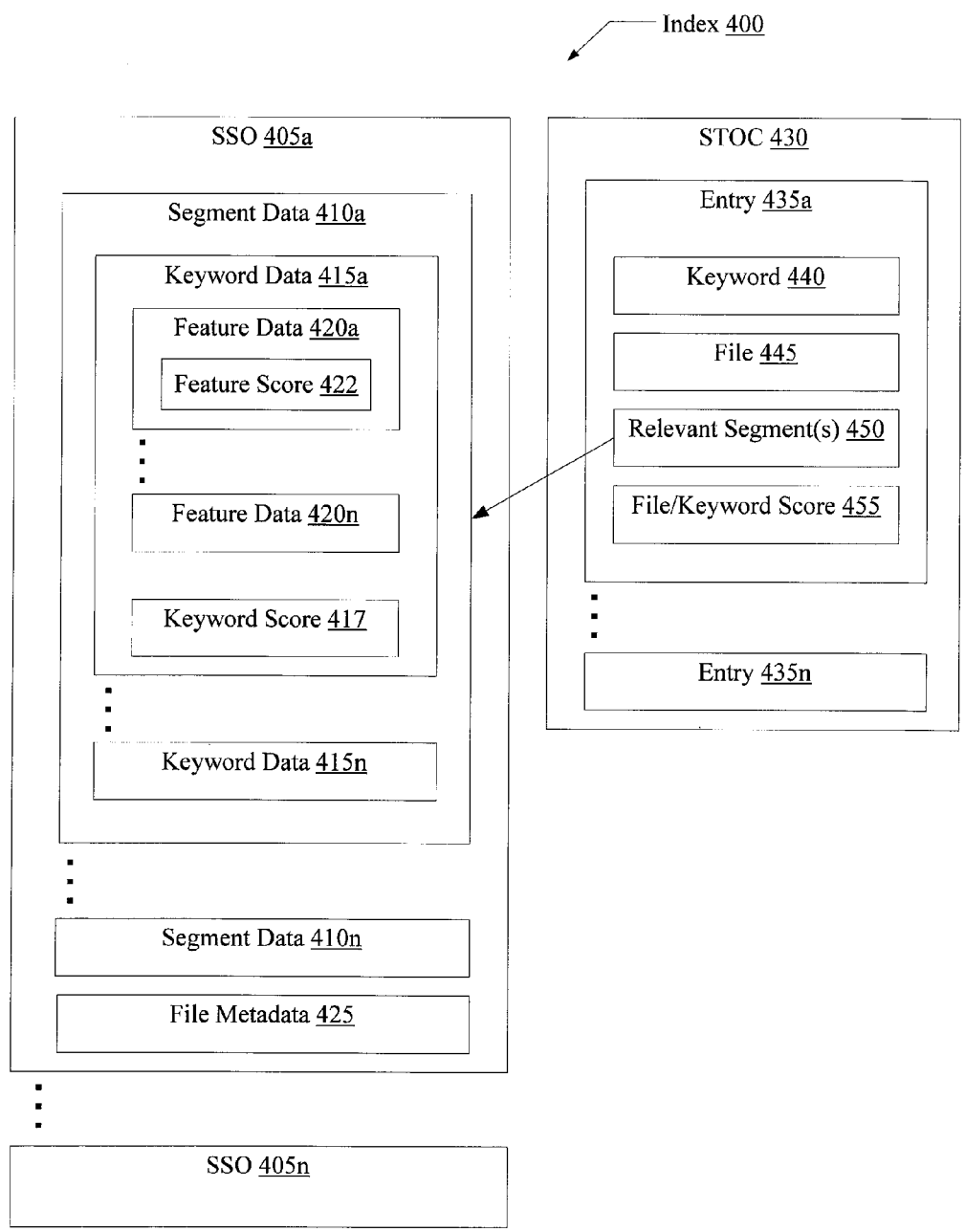
FIG. 4 is a block diagram illustrating the logical organization of an index, according to some embodiments.

FIG. 4 is a block diagram illustrating the logical organization of an index, according to some embodiments. Index 400 of FIG. 4 may correspond to index 120 of FIG. 1 and/or may be created by indexing method 200 (e.g., in 235).

In FIG. 4, different components of index 400 are illustrated as containing sub-components. Such subcomponents may be literally included in the parent component (i.e., "deep copy") or included by reference (i.e., "shallow copy"). To include a subcomponent by reference, a component may include a pointer to the subcomponent (e.g., memory pointer), an identifier of the subcomponent, or any other means that would enable a program to locate the subcomponent.

According to the illustrated embodiments, index 400 includes a separate "structure searchable object" (SSO) component for each indexed multimedia file. In the illustrated embodiment, the SSO components are labeled 410a-410n. An SSO component contains file metadata (e.g., 425), which may include various information related to the corresponding multimedia file, such as the file name, location, size, creation date, tag data (e.g., GPS information), etc. An SSO component (e.g., 405) may include any number of segment data components (e.g., 410) for storing data related to respective segments of the file. For example, if SSO 405a corresponds to a given movie file, which was broken into five 10-second segments, SSO 405a may include four segment data components 410, each corresponding to a respective one of the five segments.

A segment data component (e.g., 410) may include segment metadata, such as a segment identifier, a corresponding timeframe, or other metadata. In addition, a segment data component (e.g., 410a) may include any number of "keyword data" components (e.g., 415a-415n) for storing data related to respective keywords determined to be relevant to the segment. For example, if the segment corresponding to segment data 410a included features relevant to the keywords "bird" and "ocean," then segment data 410a may include two keyword data components 415, each corresponding to a respective one of the two keywords.

A keyword data component (e.g., 415a) may include keyword metadata, such as the name or other identifier of the keyword (e.g., "bird", "ocean", etc.). In addition, the keyword data component may include any number of "feature data" components (e.g., 420a-420n) for storing data related to respective features of the segment on which the relevance of the keyword was established. For example, if the segment corresponding to segment data 410a includes an image that was associated with the keyword "bird," then segment data 410(a) may include a keyword data component (e.g., 415a) corresponding to the keyword "bird," and that keyword data component would include a feature data component (e.g., 420a) corresponding to the image of the bird. If the keyword was associated with multiple features in the segment (e.g., an image of a bird and the sound of a bird), the keyword data component may include multiple feature data components (e.g., 420a-420n), each corresponding a respective one of the associated features.

Each feature data component (e.g., 420a) may include various feature metadata (e.g., type of feature, prominence of feature, feature identifier, etc.) and a feature score 422. As discussed above, the feature score corresponds to the additional relevance of the keyword to the segment based on the presence of the feature in the segment. For example, feature score 422 indicates the additional relevance of the keyword associated with 415a to the segment associated with 410a based on the presence of the feature associated with 420a. The feature score of a particular feature may depend on the type of feature, the prominence of the feature in the segment, and/or on other factors.

Each keyword data component (e.g., 415a) may include a keyword score (e.g., 417), which may indicate the relevance of the associated keyword to the segment. In some embodiments, the keyword score 417 may be a function of the individual feature scores of each feature data component 420 of the keyword data component 415. For example, the keyword score 417 may be a summation or any other function of the feature scores of the keyword data component. Thus, the keyword score may correspond to a summary of the feature scores, which are dependent on the weight of the feature's media type and/or on the prevalence of the feature in the segment.

Consider now a concrete example of creating an SSO structure, such as 405a, according to some embodiments. Suppose the database contains a ten-second video file in which an eagle soars over a mountain and can be heard crying while a narrator explains the scene. The system may first create an SSO structure to represent the video.

The system may first decompose the video into segments according to various criteria and create a segment data structure (e.g., 410) for each segment. In this example, suppose the system is pre-configured to segment video into five-second segments (although any static or dynamic criteria may be used as discussed above) and therefore segments the ten-second video into two five-second segments. The system therefore creates a separate segment data structure 410 for each segment.

For each segment, the system then begins populating the corresponding segment data structure by identifying features present in the segment and keywords associated with those features. Suppose that the system identifies within the first segment four features: (1) the image of the eagle, (2) the cry of the eagle, (3) the narrator's description of the eagle, and (4) the image of the mountain. The system may associate each feature with any number of keywords. For example, the image of the eagle may be associated with the keyword "eagle" and with the keyword "bird," while the narration may be associated with the keywords "eagle" and "nature."

For each unique keyword associated with at least one of the features in the segment, the system may create a keyword data structure, such as 415. For example, given the keywords identified above, the system may create at least three respective keyword data structures (i.e., for "eagle," "bird," and "nature" respectively) within the segment data structure.

Each keyword data structure may include a separate data structure for each identified feature (e.g., 420). In the running example, the keyword data structure corresponding to the keyword "eagle" may include at least one feature data structure corresponding to the image of the eagle and another corresponding to the narration because both features (i.e., image and narration) were associated with the keyword "eagle." The keyword data structures corresponding to the "bird" and "nature" keywords may include feature data structures corresponding to the image of the eagle and the narration respectively.

Each feature data structure may include a feature score (e.g., 422) that reflects a function of the media type of the feature and/or the prominence of the feature in the segment. In various embodiments, different systems may calculate the feature score according to different weightings.

To determine the feature score of a given feature, the system may determine the media type of the feature and determine a weight of that media type by performing a lookup of the media type in a weight table. For example, the weight table may associate an image with a weight of 10 and voiceover narration with a weight of 5.

The system may also determine a prominence of the feature. For example, if the image of the bird appears only in the first two seconds of the video segment but the narration continues for the entire five seconds, the prominence of the narration (e.g., 5) may be greater than that of the image (e.g., 2).

To determine the feature score of each feature, the system may combine the weight of the feature's media type with the prominence of the feature. For example, the system may be configured to calculate the feature score by multiplying the weight (from the weight table) of the feature and the prominence score. In the running example, the feature score of the eagle image in the first segment may therefore be 20 (10×2) while the feature score of the narration in the first segment may be 25 (5×5).

The system may then determine a keyword score (e.g., 417) for each keyword associated with the segment. For example, the keyword score may be a sum of the feature scores (or some other function). In the running example, the keyword score of "eagle" may therefore be 45 (i.e., feature score of 20 from the eagle image plus a feature score of 25 from the narration). Accordingly, the keyword score may indicate a relevance of the keyword to the segment.

In some embodiments, index 400 may include a static table of contents (STOC), such as STOC 430. The STOC may enable one to determine relevant files and/or segments given a keyword. For example, STOC 430 may include a separate entry 435a-435n for each keyword/file combination. In the illustrated embodiment, STOC 430 includes entry 435a that includes identifiers for keyword 440, file 445, relevant segments 450 (i.e., one or more segments of file 445 that are relevant to keyword 440), and file/keyword score 445 (i.e., relevance of keyword 440 to file 445).

In some embodiments, relevant segments 450 may indicate each segment of file 445 that is relevant to the keyword. For example, a segment of file 445 may be relevant to keyword 440 if the segment's corresponding segment data component 410 (in the SSO 405 of file 445) includes a keyword data component corresponding to keyword 440.

In some embodiments, the file/keyword score 445 may be calculated based on the keyword scores of relevant segments 450. That is, the relevance of a keyword to a file may be based on the relevance of that keyword to each segment of the file.

In various embodiments, the SSO, weight information, and/or STOC may be stored in different formats, such as tables of a relational database system. An example of such tables is illustrated in FIG. 5. SSO table 500 is an example of SSO data stored in a table, according to some embodiments. Weight table 510 is an example of weight data stored in a table, according to some embodiments. STOC 520 illustrates a static table of contents stored in a table, according to some embodiments.

Tables of 500-530 may be illuminated by the following scenario. A father films a video of his daughter Lisa and sons Olle and Jerry. The video is automatically segmented into ten-second segments and features (e.g., images, text, sound, etc.) are identified and associated with keywords as described above.

In the first segment, Lisa appears once and speaks for five seconds. Accordingly, the image of Lisa and voice of Lisa are identified as two features identified with the keyword "Lisa" in the first segment.

As discussed above, the system may calculate a rank for the keyword "Lisa" in the segment based on the weights of the features' media types (as shown in weight table 510) and on a degree of prominence of those features in the segment. For example, in this case, weight table 510 indicates that the weight of an image is 10 and the weight of voice is 2. The prominence may be calculated (in this example) based on the length and number of appearances of the features (i.e., one appearance, five seconds). Accordingly, the rank of the keyword "Lisa" for segment 1 may be calculated as a summation of weights and prominence (image (10)+voice (2)+appearances (1)+length of appearance (5)=18).

In the second segment, the father films Olle playing (image, 10) while Lisa speaks (voice, 2) but is not seen. Olle's appearance and Lisa's speaking both occur once and for three seconds. Accordingly, in the second segment, the keyword "Olle" has a rank of 14 (image 10+appearances (1)+length (3)=14) and the keyword "Lisa" has a rank of 6 (voice (2)+appearances (1)+length (3)=6).

In the third segment Jerry appears eating a banana and playing with a ball in front of a sign that reads "ICA." Jerry appears twice for a total of eight seconds. The banana is visible once for one second and the ball is visible once for two seconds. Accordingly, the rank scores for Jerry, Banana, Ball, and ICA are 22 (10+2+8+2), 12 (10+1+1), 13 (10+2+1), and 11 (5+4+2) respectively.

STOC 520 is an example of a static table of contents created from SSO table 500 and one or more other SSO objects relating to a separate file. The STOC can be queried with keywords to identify relevant files and segments. For example, suppose a user queries for the keyword "Lisa." In response, the application may perform a lookup in STOC 520 to find all entries associated with the keyword "Lisa" and find relevance in files xxx and yyy. The application may then find the SSO structures associated with files xxx and yyy and determine and rank the relevance of each segment in those files to the keyword Lisa. For example, the application may use STOC 520 to determine that the most relevant segment is segment 3 of file yyy, then segment 1 of file xxx, and finally segment 2 of file xxx. The application may then return the results ranked in that order.

Figure 6:
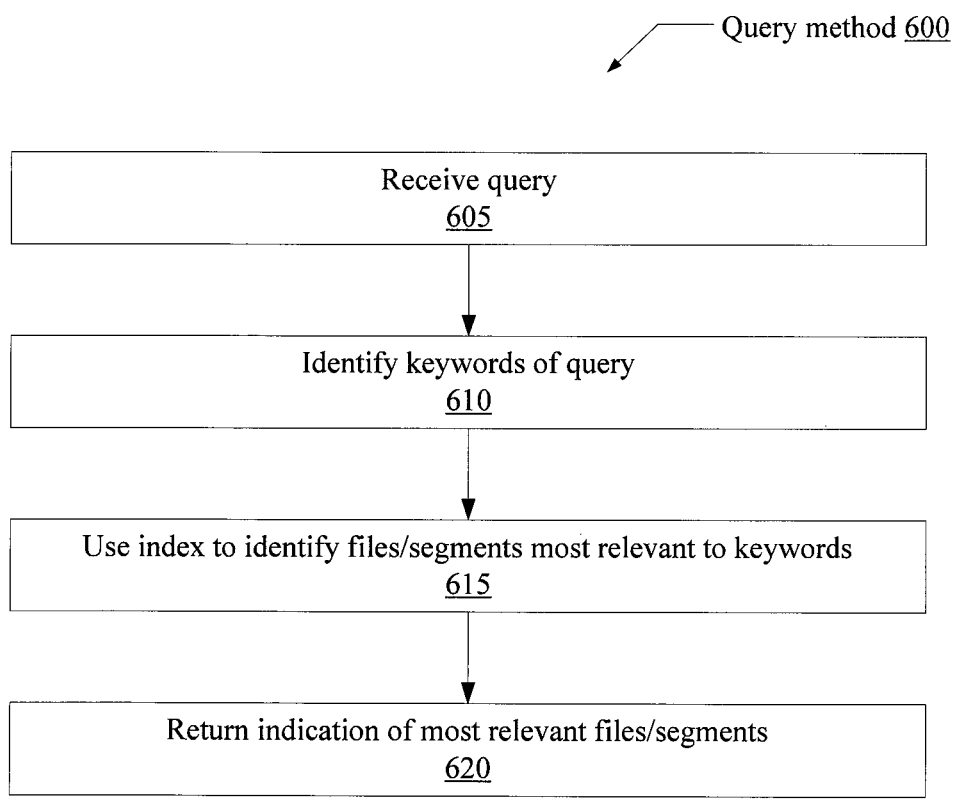
FIG. 6 is a flow diagram illustrating a method for using the index to identify relevant content in a multimedia content database, according to some embodiments.

FIG. 6 is a flow diagram illustrating a method for using the index to identify relevant content in a multimedia content database, according to some embodiments. Method 600 may be performed by query interface/logic, such as query logic 115.

According to the illustrated embodiment, query method 600 begins in 605 when the query logic receives the query. As described above, the query may comprise one or more keywords and/or multimedia content. For example, a user may query the database for videos that are similar to a given query video.

In 610, the query logic identifies one or more keywords from the query. If the query is provided in the form of text, then identifying the keywords in 610 may simply involve identifying the keywords indicated by the text. Identifying keywords indicated by text may include parsing the text, interpreting regular expressions, and/or other parsing/interpretation activity. If the query is provided as a multimedia file (e.g., another movie, a picture, etc.), then identifying the keywords in 610 may comprise extracting features from the query multimedia and identifying keywords associated with the extracted features. The feature extraction may be performed similarly to the feature extraction used to create the index (e.g., 220-230 of FIG. 2).

In 615, the query logic uses the index to identify files and/or segments that are most relevant to the identified query keywords. In 620, the query logic returns an indication of the most relevant files and/or segments identified in 615. In some embodiments, the query logic may return the files and/or segments themselves.

Figure 7:
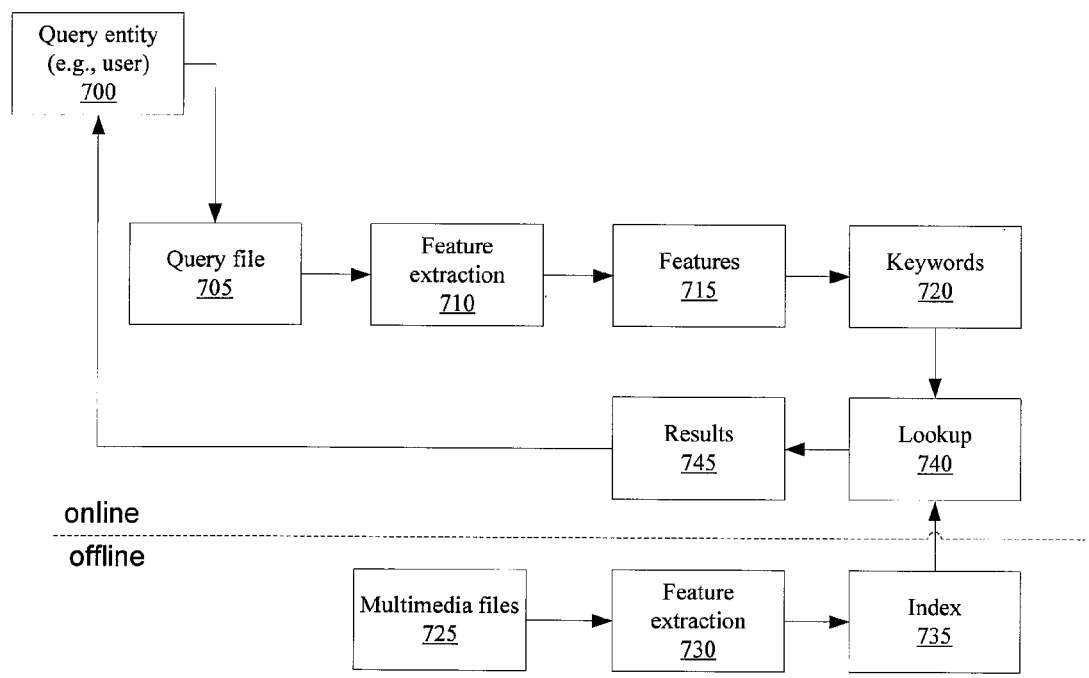
FIG. 7 is a block diagram illustrating the flow of a multimedia-based query, according to some embodiments.

FIG. 7 is a block diagram illustrating the flow of a multimedia-based query, according to some embodiments. The flow of FIG. 7 may correspond to query method 500. Activity above the dashed line represents "online" activity (i.e., happening during service of the query) while activity below the dashed line indicates offline activity (i.e., happening in advance of rather than in response to the query.

According to the illustrated embodiment, multimedia files 725 exist in a multimedia database. From those files, indexing logic (e.g., 105 of FIG. 1) extracts features from the files (as in 730) and creates an index (as in 735). The process according to some embodiments is described above with respect to FIGS. 2 and 3.

According to the illustrated embodiment, a query entity 700 (e.g., a user) submits a query file 705. The query file 705 may comprise any multimedia file that embodies the query. For example, the user may submit a movie that is similar to the types of movies for which he is searching.

In 710, the query logic extracts features from the query file (similar to feature extraction 730) and identifies keywords 720 associated with the extracted features. The query logic then uses the keywords 720 and index 735 to perform lookup 740. Results 745 of lookup 740 are then returned to the query entity 700.

Figure 8:
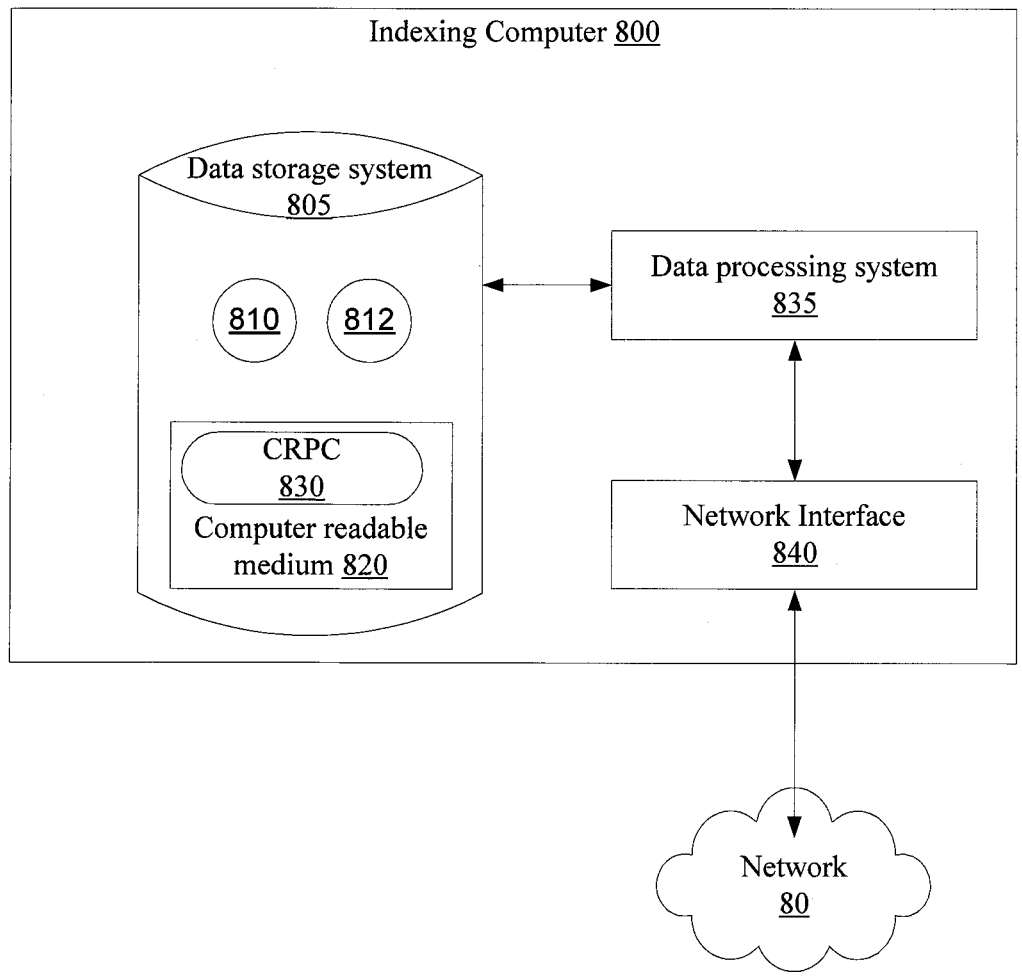
FIG. 8 illustrates a possible implementation for at least some components of a indexing computer, according to some embodiments.

FIG. 8 illustrates a possible implementation for at least some components of an indexing computer, according to some embodiments. As shown in FIG. 8, indexing computer 800 may include: a data processing system 835, which may include one or more data processing devices each having one or more microprocessors and/or one or more circuits, such as an application specific integrated circuit (ASIC), Field-programmable gate arrays (FPGAs), etc; a network interface 840 for receiving messages (e.g., messages transmitted from a clients 105) and transmitting messages; a data storage system 805, which may include one or more computer-readable mediums, such as non-volatile storage devices and/or volatile storage devices (e.g., random access memory (RAM)).

In embodiments where data processing system 835 includes a microprocessor, a indexing computer program product is provided. Such a computer program product may include computer readable program code 830, which implements a computer program, stored on a computer readable medium 820. Computer readable medium 820 may include magnetic media (e.g., a hard disk), optical media (e.g., a DVD), memory devices (e.g., random access memory), etc. In some embodiments, computer readable program code 830 is configured such that, when executed by data processing system 835, code 830 causes the processing system to perform steps described above (e.g., steps described above with reference to the flow charts of FIGS. 2-5).

In other embodiments, collaboration server 800 may be configured to perform steps described above without the need for code 830. For example, data processing system 835 may consist merely of specialized hardware, such as one or more application-specific integrated circuits (ASICs). Hence, the features of the present invention described above may be implemented in hardware and/or software. For example, in some embodiments, the functional components of collaboration server described above may be implemented by data processing system 835 executing computer instructions 830, by data processing system 835 operating independent of any computer instructions 830, or by any suitable combination of hardware and/or software.

FIG. 9 illustrates an embodiment of a computer readable program code (CRPC) 730, according to some embodiments. In the embodiment shown, CRPC 830 includes (1) a set of instructions 905 for segmenting content into a plurality of segments, (2) a set of instructions 910 for identifying, for each segment, one or more features present in the segment, where the features are of respective media types, (3) a set of instructions for identifying, for each identified feature in each segment, one or more respective keywords associated with the identified feature, and (4) a set of instructions for determining, for each identified keyword associated with an identified feature in a given segment, a respective relevance of the keyword to the given segment, wherein the respective relevance is dependent on a weight associated with the respective media type of the identified feature.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for indexing multimedia content, the method comprising:

segmenting the multimedia content, by a computer, into a plurality of segments;

identifying by the computer, for each segment, one or more features present in the segment, wherein the features are of respective media types;

identifying by the computer, for each identified feature in each segment, one or more respective keywords associated the identified feature; and determining by the computer, for each identified keyword associated with an identified feature in a given segment, a respective relevance of the keyword to the given segment, wherein the respective relevance is dependent on a weight associated with the respective media type of the identified feature.

2. The method of claim 1, further comprising:

creating, by the computer, an index for the multimedia content, wherein the index correlates each identified keyword with those of the plurality of segments that are determined as being relevant to the keyword based on the determined respective relevances;

receiving, by the computer, a query for multimedia content;

determining, by a the computer, a keyword based on the query;

determining, by a the computer, a segment of the plurality of segments based on the determined keyword and the index; and providing, by the computer, an indication of the segment.

3. The method of claim 2, further comprising: providing, by the computer, in response to the query, a list of segments arranged in order of relevance.

4. The method of claim 1, further comprising: determining a relevance of at least one of the keywords to a file comprising multiple segments, wherein the keyword's relevance to the file is dependent on the relevances of the keyword to the multiple segments of the file.

5. The method of claim 1, wherein the respective relevance of the keyword to the given segment is further dependent on a prominence of the identified feature associated with the keyword within the given segment.

6. The method of claim 5, wherein the prominence is dependent on a proportion of the given segment in which the identified feature is present.

7. The method of claim 1, wherein the content comprises a plurality of audio-visual files.

8. The method of claim 1, wherein the different media types include at least one of image, sound, text, speech, or content metadata.

9. The method of claim 8, wherein the content metadata includes at least one of: geographic positioning data, user generated text associated with the feature, or other user generated tags.

10. A non-transitory computer-readable storage medium storing program instructions executable by a computer to implement a multimedia content indexer configured to:

segment multimedia content into a plurality of segments;

identify, for each segment, one or more features present in the segment, wherein the features are of respective media types;

identify, for each identified feature in each segment, one or more respective keywords associated the identified feature; and determine, for each identified keyword associated with an identified feature in a given segment, a respective relevance of the keyword to the given segment, wherein the respective relevance is dependent on a weight associated with the respective media type of the identified feature.

11. The medium of claim 10, wherein the program instructions are further executable to:

create an index for the multimedia content, wherein the index correlates each identified keyword with those of the plurality of segments that are determined as being relevant to the keyword based on the determined respective relevances.

12. The medium of claim 11, wherein the program instructions are further executable to:

receive a query for multimedia content;

determine a keyword based on the query;

determine a segment of the plurality of segments based on the determined keyword and the index; and provide an indication of the segment.

13. The medium of claim 10, wherein the program instructions are further executable to: determine a relevance of at least one of the keywords to a file comprising multiple segments, wherein the keyword's relevance to the file is dependent on the relevances of the keyword to the multiple segments of the file.

14. The medium of claim 10, wherein the respective relevance of the keyword to the given segment is further dependent on a prominence of the identified feature associated with the keyword within the given segment.

15. The medium of claim 10, wherein the different media types include at least one of image, sound, text, speech, or content metadata.

16. An apparatus comprising:

a processor;

a memory coupled to the processor, wherein the memory stores program instructions executable by the processor to implement a multimedia content indexer configured to:

segment multimedia content into a plurality of segments;

identify, for each segment, one or more features present in the segment, wherein the features are of respective media types;

identify, for each identified feature in each segment, one or more respective keywords associated the identified feature; and determine, for each identified keyword associated with an identified feature in a given segment, a respective relevance of the keyword to the given segment, wherein the respective relevance is dependent on a weight associated with the respective media type of the identified feature.

17. The apparatus of claim 16, wherein the program instructions are further executable to:

create an index for the multimedia content, wherein the index correlates each identified keyword with those of the plurality of segments that are determined as being relevant to the keyword based on the determined respective relevances.

18. The apparatus of claim 17, wherein the program instructions are further executable to:

receive a query for multimedia content;

determine a keyword based on the query;

determine a segment of the plurality of segments based on the determined keyword and the index; and provide an indication of the segment.

19. The method of claim 1, wherein a first of said one or more respective keywords is associated with a first identified feature and a second identified feature, and the step of determining the respective relevance of said first keyword comprises:

determining a first feature score for the first identified feature;

determining a second feature score for the second identified feature;

determining a first keyword score for the first keyword, wherein determining the first keyword score for the first keyword comprises calculating the first keyword score using the first feature score for the first identified feature and the second feature score for the second identified feature; and associating the calculated first keyword score with the first keyword.

20. The method of claim 19, wherein the step of determining a first feature score for the first identified feature comprises:

determining a respective media type of the first identified feature;

determining a weight value associated with the determined respective media type;

determining a prominence value identifying a prominence of the first identified feature within the segment in which the first identified features was identified; and calculating the first feature score using the weight value and the prominence value.

21. The method of claim 1, wherein a given one of the identified keywords is associated with, at the least, i) a first feature present in a first segment of the multimedia content and ii) a second feature also present in the first segment of the multimedia content;

determining the relevance of said given keyword to the first segment comprises:

a) determining a first relevance score for the first feature based on one or more of the weight associated with the media type of the first feature and a prominence of the first feature within the first segment, b) determining a second relevance score for the second feature based on one or more of the weight associated with the media type of the second feature and a prominence of the second feature within the first segment, c) calculating the relevance of the given keyword using the first relevance score and the second relevance score as inputs to the calculation.

22. The method of claim 21, wherein calculating the relevance of the given keyword comprises summing a set of values, said set of values comprising the first relevance score and the second relevance score.

23. The method of claim 21, further comprising determining a relevance of said given keyword to the multimedia content.

24. The method of claim 23, wherein the given keyword is further associated with a third feature present in a second segment of the multimedia content, and determining the relevance of said given keyword to the multimedia content comprises calculating the relevance of said given keyword to the multimedia content using, as inputs to the calculation, i) the relevance of said given keyword to the first segment of the multimedia content and ii) a relevance of said given keyword to the second segment of the multimedia content.

25. The method of claim 24, wherein calculating the relevance of said given keyword to the multimedia content comprises summing a set of values, said set of values comprising i) the relevance of said given keyword to the first segment of the multimedia content and ii) the relevance of said given keyword to the second segment of the multimedia content.

26. The method of claim 1, wherein the weight associated with the respective media type is a pre-defined weight assigned to features of that media type, and wherein determining the respective relevance comprises determining the weight from a weight table that identifies weights associated with different media types.

27. The method of claim 1, wherein the multimedia content is stored in a file, and the length of the at least one of the plurality of segments is dependent on an attribute of the file.

28. The method of claim 1, wherein identifying one or more respective keywords associated an identified feature comprises performing an image recognition technique on the feature.

29. The method of claim 2, wherein the query for multimedia content comprises a multimedia file, and determining a keyword based on the query comprises extracting a feature from the multimedia file and identifying a keyword associated with the extracted feature.

* * * * *

UNITED STATES PATENT AND TRADEMARK OFFICE
CERTIFICATE OF CORRECTION

PATENT NO. : 9,846,696 B2  
APPLICATION NO. : 13/408448  
DATED : December 19, 2017  
INVENTOR(S) : Arngren et al.

Page 1 of 2

It is certified that error appears in the above-identified patent and that said Letters Patent is hereby corrected as shown below:

On the Title Page

In Item (75), under "Inventors", in Column 1, Lines 1-2, delete "Sodra Sunderbyn (SE);" and insert -- Södra Sunderbyn (SE); --, therefor.

In Item (75), under "Inventors", in Column 1, Line 2, delete "Joakim Soderberg," and insert -- Joakim Söderberg, --, therefor.

In Item (75), under "Inventors", in Column 1, Line 3, delete "Marika Stalnacke," and insert -- Marika Stålnacke, --, therefor.

In Item (57), under "ABSTRACT", in Column 2, Line 8, delete "associated the" and insert -- associated with the --, therefor.

In the Specification

In Column 1, Line 52, delete "associated the" and insert -- associated with the --, therefor.

In Column 2, Line 37, delete "associated the" and insert -- associated with the --, therefor.

In Column 2, Line 54, delete "associated the" and insert -- associated with the --, therefor.

In Column 3, Line 23, delete "of a" and insert -- of an --, therefor.

In Column 7, Line 53, delete "405)" and insert -- 405a) --, therefor.

In Column 9, Lines 66-67, delete "file/keyword score 445" and insert -- file/keyword score 455 --, therefor.

In Column 10, Line 5, delete "SSO 405" and insert -- SSO 405a --, therefor.

Signed and Sealed this  
Fourteenth Day of April, 2020

Andrei Iancu  
*Director of the United States Patent and Trademark Office*

In Column 10, Line 7, delete "file/keyword score 445" and insert -- file/keyword score 455 --, therefor.

In Column 12, Line 7, delete "a indexing" and insert -- an indexing --, therefor.

In Column 12, Line 33, delete "(CRPC) 730," and insert -- (CRPC) 830, --, therefor.

In the Claims

In Column 13, Lines 5-6, in Claim 1, delete "associated the" and insert -- associated with the --, therefor.

In Column 13, Line 22, in Claim 2, delete "by a the" and insert -- by the --, therefor.

In Column 13, Line 24, in Claim 2, delete "by a the" and insert -- by the --, therefor.

In Column 13, Line 60, in Claim 10, delete "associated the" and insert -- associated with the --, therefor.

In Column 14, Line 40, in Claim 16, delete "associated the" and insert -- associated with the --, therefor.

In Column 16, Line 36, in Claim 28, delete "associated an" and insert -- associated with an --, therefor.